No. 624,990.  
J. S. SMITH.  
VALVE.  
(Application filed Dec. 12, 1898.)  
Patented May 16, 1899.

(No Model.)

Witnesses.  
Wm. M. Rheem  
H. J. Barrett

Inventor  
J. S. Smith  
by Elliott & Hopkins  
Atty's

THE NORRIS PETERS CO., PHOTO-LITHO., WASHINGTON, D. C.

UNITED STATES PATENT OFFICE.

JACOB S. SMITH, OF CHICAGO, ILLINOIS.

VALVE.

SPECIFICATION forming part of Letters Patent No. 624,990, dated May 16, 1899.

Application filed December 12, 1898. Serial No. 698,990. (No model.)

*To all whom it may concern:*

Be it known that I, JACOB S. SMITH, a citizen of the United States, residing at Chicago, in the county of Cook and State of Illinois, have invented certain new and useful Improvements in Valves, of which the following is a full, clear, and exact specification.

My invention relates more particularly to piston-valves especially designed for use in restricted passages, such as wells, for checking the flow of fluid from lateral ports in a pipe inserted in such passage or from such passage into said pipe; and the invention has for its object to so construct and arrange such valve and connected parts that the lateral discharge may be readily controlled without restricting the flow through the pipe or in any manner reducing the interior diameter of the latter, while at the same time keeping the outside diameter of the pipe and connected parts down to the minimum, so as not to choke up the restricted passage in which it is contained when in use.

With these ends in view my invention consists in certain features of novelty in the construction, combination, and arrangement of parts by which the said objects and certain other objects hereinafter appearing are attained, all as fully described with reference to the accompanying drawings, and more particularly pointed out in the claims.

Figure 1:
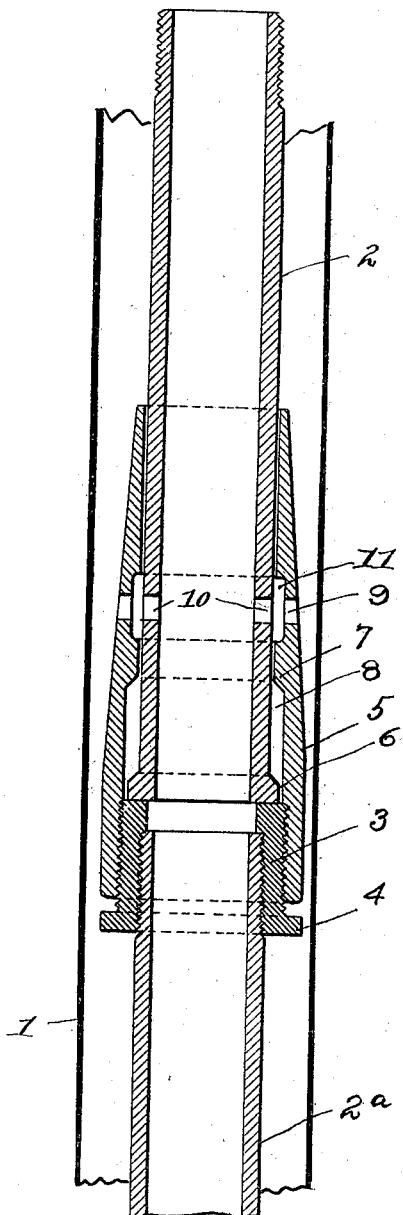
Figure 2:
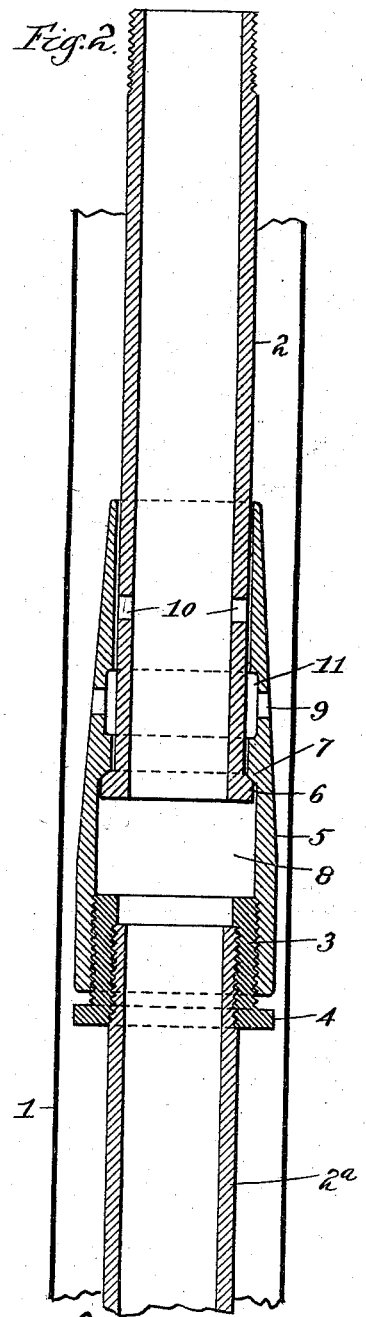

In the said drawings, Figure 1 is a longitudinal sectional view of a valve constructed according to my invention, showing the valve open, the passage containing the valve and pipe being shown in dotted lines; and Fig. 2 is a similar view showing the valve closed.

The aforesaid restricted passage into which it may be desired to discharge a liquid, gas, or other fluid laterally from a pipe contained therein or from which it may be desired to discharge such fluid into such pipe is shown at 1 and may represent a well or any other duct or passage where a valve of the described character could be used, and 2 2ª represent the pipe contained in the passage 1. This pipe is made up of alined sections of minimum thickness but of maximum interior diameter, so as to occupy as little space within the passage 1 as possible, while at the same time affording a passage of maximum size for the fluid passing through the pipe-sections. The pipe-sections 2 2ª are also of substantially equal diameter, and to the lower one is screwed a bushing 3, whose outer end is provided with a turning-head 4, and its exterior is threaded in the lower end of an upwardly-tapering sleeve 5, which surrounds the lower end of the pipe-section 2 and forms a snug joint therewith, the engaging surfaces of the pipe-section 2 and sleeve 5 being preferably ground.

The lower end of the pipe-section 2 is provided with a peripheral shoulder 6, whose upper edge is preferably conical, so as to constitute a valve which when the pipe-section 2 is raised seats against a shoulder 7 of complementary shape formed around the interior of the sleeve 5 and at the upper end of a recess 8 therein, in which the flange 6 rises and falls as the pipe-section 2 is lifted or lowered. When lifted, the valve-like flange 6 comes into contact with the shoulder 7, which constitutes a valve-seat therefor and prevents the escape of fluid from the interior of the pipe-sections and the recess 8 to the space between the sleeve and the pipe-section 2.

Above the shoulder 7 the sleeve 5 is provided with a peripheral series of discharge-ports 9, and the pipe-section 2 is likewise provided with a similar series of ports 10, which are so arranged that when the section 2 is lowered the ports 9 10 will substantially coincide, the sleeve 5 being provided around its interior with an annular recess 11, which receives the discharge from the ports 10 and constitutes a manifold for directing the discharge through the ports 9. This discharge takes place when the pipe-section 2 is lowered with relation to the pipe-section 2ª, and when allowed to descend its full movement it bottoms on the upper end of the bushing 3, which fits in the lower end of the recess 8, and constitutes a stop for gaging the movement of the pipe-section 2 and bringing the discharge-ports into coincidence. When in this position, it is readily seen that the discharge may take place freely from the interior of the pipe-sections 2 into the passage 1, or vice versa.

The maximum diameter of the bushing 3 where it enters the sleeve 5 is sufficiently larger than the flange 6 to permit the lower end of the pipe-section 2 to pass out through the sleeve when the bushing is removed.

Having thus described my invention, what I claim as new therein, and desire to secure by Letters Patent, is—

1. The combination of two alined pipe-sections relatively movable and one of which is provided with lateral ports and a peripheral flange constituting a valve, a sleeve secured to one of said pipe-sections and surrounding the other and also having lateral ports adapted to coincide with the first said ports, said sleeve having an interior recess to permit of the movement of said peripheral flange and a shoulder between said recess and the ports in the sleeve, constituting a valve-seat for said flange, substantially as set forth.

2. The combination of two alined pipe-sections relatively movable and one of which is provided with lateral ports and a peripheral flange constituting a valve, a sleeve surrounding one of said pipe-sections and having lateral ports adapted to coincide with the first said ports and an interior recess to permit of the movement of said peripheral flange, said sleeve also having a shoulder constituting a valve-seat located between said recess and said ports, and a bushing secured to the exterior of the other of said pipe-sections and in the interior of said sleeve, substantially as set forth.

3. The combination of two alined pipe-sections relatively movable and one of which is provided with lateral ports and a peripheral flange constituting a valve, a sleeve surrounding one of said pipe-sections and having ports adapted to coincide with the first said ports, a recess for the movement of said flange and a shoulder located between said ports and one end of said recess and constituting a valve-seat for said flange, a bushing secured in the end of said sleeve at the other end of said recess and forming a shoulder for the end of said movable pipe-section to bottom on, said bushing having an exterior diameter as large as the diameter of said flange and being secured on the exterior of the other of said sections, substantially as set forth.

JACOB S. SMITH.

Witnesses:
EDNA B. JOHNSON,
F. A. HOPKINS.